US012486107B2

(12) United States Patent
Chaffee

(10) Patent No.: US 12,486,107 B2
(45) Date of Patent: Dec. 2, 2025

(54) DIAPER PAILS WITH ODOR CONTAINMENT

(71) Applicant: Margaret K. Chaffee, Winnetka, IL (US)

(72) Inventor: Margaret K. Chaffee, Winnetka, IL (US)

( * ) Notice: Subject to any disclaimer, the term of this patent is extended or adjusted under 35 U.S.C. 154(b) by 30 days.

(21) Appl. No.: 18/658,279

(22) Filed: May 8, 2024

(65) Prior Publication Data

US 2024/0375859 A1 Nov. 14, 2024

Related U.S. Application Data

(60) Provisional application No. 63/464,886, filed on May 8, 2023.

(51) Int. Cl.
*B65F 1/16* (2006.01)
*B65F 1/06* (2006.01)

(52) U.S. Cl.
CPC .............. *B65F 1/1607* (2013.01); *B65F 1/06* (2013.01); *B65F 2001/1676* (2013.01); *B65F 2240/132* (2013.01)

(58) Field of Classification Search
CPC .......... B65F 1/06; B65F 1/1607; B65F 1/062; B65F 1/1615; B65F 1/00006; B65F 2210/1675; B65F 2240/132; B65B 67/1277; B65B 9/15; A47G 29/1209; A47G 29/12095; A47G 29/1207; A47G 29/12; A47G 29/1251; A47G 29/22
USPC .... 232/30, 47, 45; 220/213, 495.06, 495.01, 220/908.1, 254.5, 254.3
See application file for complete search history.

(56) References Cited

U.S. PATENT DOCUMENTS

| | | | | |
|---|---|---|---|---|
| 5,419,435 A * | 5/1995 | Perzan | B65F 1/141 | 292/87 |
| 10,321,968 B2 * | 6/2019 | Burgess | A61B 50/36 | |
| 2012/0037626 A1 * | 2/2012 | Finnestad | A61B 50/36 | 220/212 |
| 2015/0021386 A1 * | 1/2015 | Farentinos | A47G 29/30 | 232/43.3 |

* cited by examiner

*Primary Examiner* — King M Chu
(74) *Attorney, Agent, or Firm* — Neal, Gerber & Eisenberg LLP

(57) ABSTRACT

Diaper pails for odor containment are disclosed. A diaper pail includes a body including an upper portion and a lower portion. The diaper pail includes a lid rotatably coupled to the upper portion. The lid is configured to rotate open to receive a diaper. The diaper pail includes a gate configured to slide horizontally within the body. The gate, the lid, and the upper portion of the body define an upper chamber configured to contain the diaper when the lid is subsequently rotated closed. The diaper pail includes a door rotatably coupled to the lower portion. The door, the gate, and the lower portion define a lower chamber that is configured to house a garbage bag such that the garbage bag is to receive the diaper from the upper chamber when the gate is slid open. The door is configured to provide access to the garbage bag.

20 Claims, 8 Drawing Sheets

DIAPER PAILS WITH ODOR CONTAINMENT

CROSS-REFERENCE TO RELATED APPLICATION

This application claims the benefit of U.S. Provisional Patent Application Ser. No. 63/464,886, filed on May 8, 2023, which is incorporated by reference herein in its entirety.

TECHNICAL FIELD

The present disclosure generally relates to diaper pails and, more specifically, to diaper pails with odor containment.

BACKGROUND

Young children, such as infants, use many diapers throughout the day. Those used diapers may stink over time. While a regular trash can may be used to dispose of those used diapers, doing so may result in an undesirable odor filling a surrounding living space (e.g., such as a bedroom). Diaper pails have been developed in an attempt to reduce the amount of odor emitted into the living space, for instance, either by masking or containing the odor. However, as many parents and/or other caretakers will tell you, existing diaper pails have been unable to eliminate the odor emitted by used diapers into living spaces.

SUMMARY

The appended claims define this application. The present document discloses aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are shown for diaper pails with odor containment. An example diaper pail disclosed herein includes a body that includes an upper portion and a lower portion. The diaper pail includes a lid rotatably coupled to the upper portion of the body. The lid is configured to rotate about a rotational axis to open to receive a diaper. The diaper pail includes a gate configured to slide horizontally within the body. The gate, the lid, and the upper portion of the body define an upper chamber. The upper chamber is configured to contain the diaper when the lid is subsequently rotated closed about the rotational axis. The diaper pail includes a door rotatably coupled to the lower portion of the body. The door, the gate, and the lower portion of the body define a lower chamber located below the upper chamber. The lower chamber is configured to house a garbage bag such that the garbage bag is to receive the diaper from the upper chamber when the gate is slid open. The door is configured to provide access to the garbage bag for replacement when the garbage bag is full.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION

Figure 1:
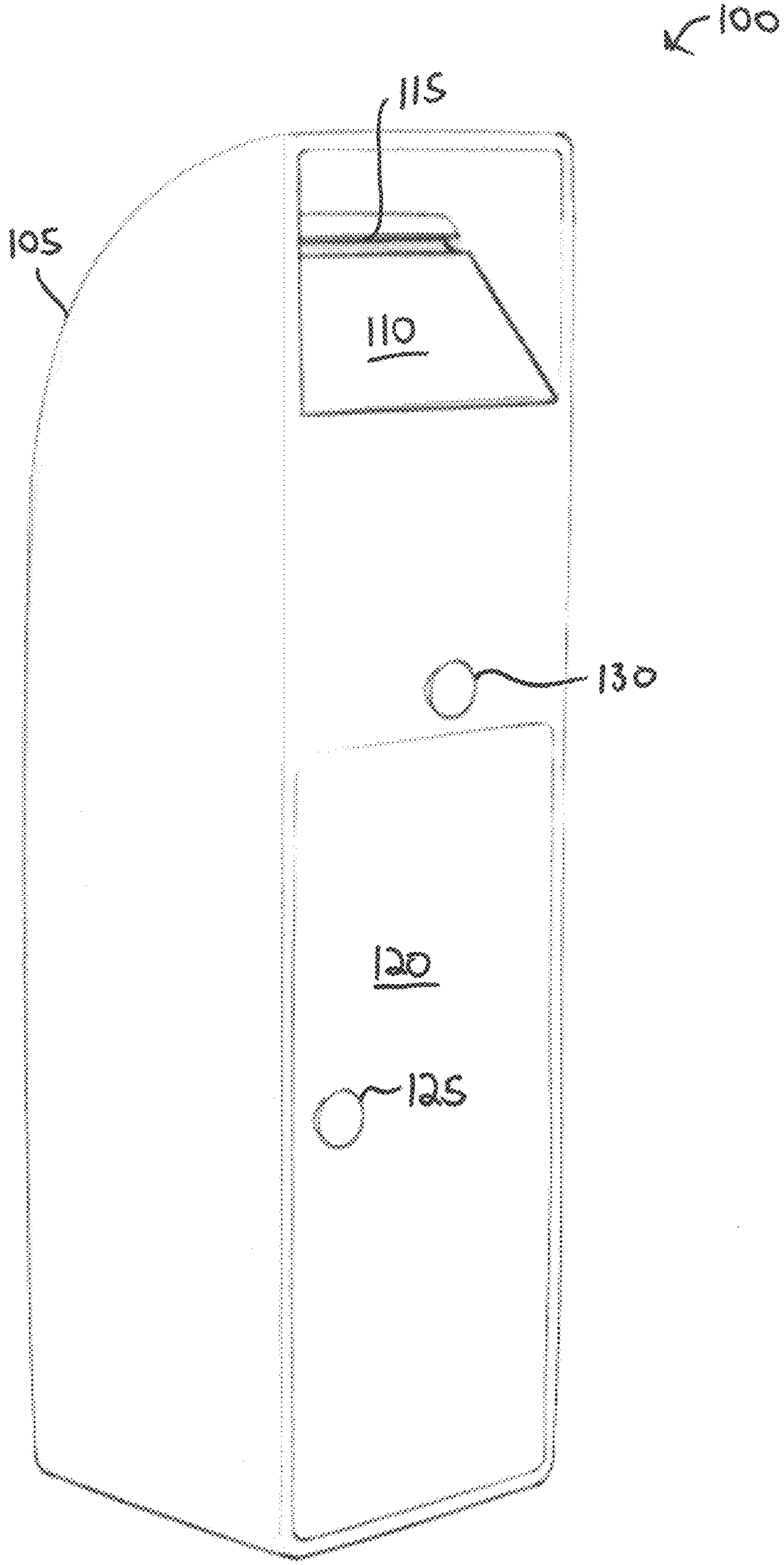
FIG. 1 is a perspective view of an example diaper pail in accordance with the teachings herein.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

Example diaper pails disclosed herein include a multi-chamber design to prevent and/or otherwise impede odor from escaping into a surrounding living space. For example, a diaper pail includes an upper chamber and a lower chamber. The lower chamber is configured to house a bag (e.g., a standard trash bag such as a tall, 13-gallon bag) in which used diapers are contained. The diaper pails also include a lid, a gate, and a door. The lid is positioned next to the upper chamber, and the door is positioned next to the lower chamber. The gate is located between the bottom of the upper chamber and the top of the bottom chamber.

In operation, the lid is opened to receive a used diaper from a user. Otherwise, the lid remains closed to contain the odor of used diapers within the diaper pail. Once the used diaper is received by the lid, the lid is closed to send the used diaper into the upper chamber and to prevent odor from escaping and/or reduce the amount of odor escaping the upper chamber. The lid is configured to slidingly engage a body of the diaper pail as it is opened and closed to prevent any gaps from being formed between the lid and the body through which odor may otherwise escape. In some examples, the lid is formed of two panels that are connected to each other at an angle. In some such examples, the two panels are configured such that at least one panel is slidingly engaged to the body at any given time. In turn, upper chamber is always fluidly isolated or disconnected from the surrounding area at all times to facilitate the sealed containment of odor within the diaper pail.

After the lid is closed upon receiving the used diaper, the user causes the gate to slide open (e.g., via a pull handle, such as a spring-loaded pull handle) such that the recently-received diaper falls securely into the bag of the lower chamber. The gate then returns to the closed position to sealingly contain the odor of the diaper within the lower chamber. The door provides easy access to the bag, but is only to be opened when the bag is full of diapers for removal and replacement. Otherwise, the door remains closed to sealingly contain the odor of the diapers within the lower chamber.

Turning to the figures, FIG. 1 illustrates an example diaper pail 100 in accordance with the teachings herein. The diaper pail 100 includes a body 105, a lid 110, and a door 120. As disclosed below in greater detail, the lid 110 (also referred to as an "upper lid," a chute lid," an "upper door," and a "chute door" is positioned adjacent to an upper chamber 170 (FIG. 2) of the diaper pail 100, and the door 120 (also referred to as a "lower door" and a "bag door") is positioned adjacent to a lower chamber 175 (FIG. 2) of the diaper pail 100.

In the illustrated example, the diaper pail 100 is a "mail-box-style" container with the lid 110 positioned along a front surface of the body 105. The lid 110 includes a handle 115 to enable a user to easily open and close the lid 110, and the door 120 includes another handle 125 to enable a user to easily open and close the door 120. In the illustrated example, the handle 115 is a pull handle (e.g., a flat, integrally-formed handle). In other examples, the handle 115 may be any other type of handle that enables the user to easily open and close the lid 110. In the illustrated example, the handle 125 is a knob. In other examples, the handle 125 may be any other type of handle that enables the user to easily open and close the door 120.

Figure 2:
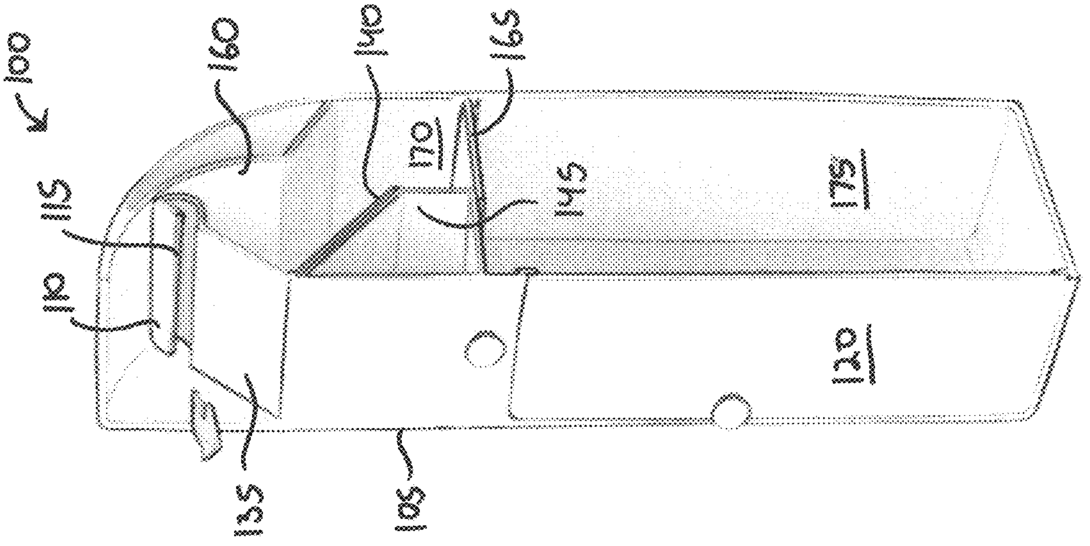
FIG. 2 is a cutaway view of the diaper pail of FIG. 1 in a closed state.

The diaper pail 100 of the illustrated example also includes another handle 130 that is configured to enable the user to easily open and close a gate 165 (FIG. 2). In the illustrated example, the handle 130 is a knob. In other examples, the handle 130 may be any other type of handle that enables the user to easily open and close the gate 165.

Figure 3:
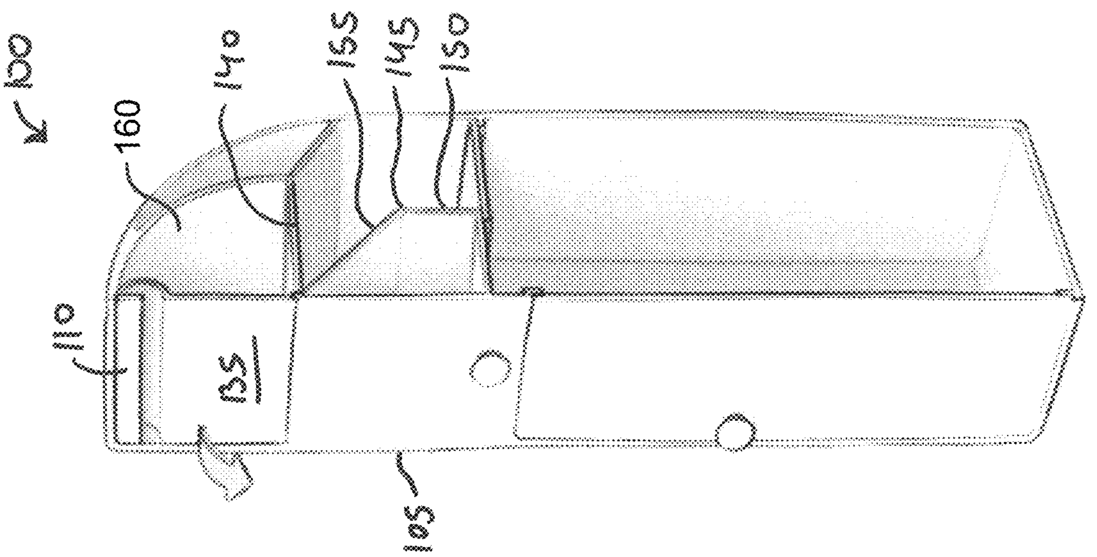
FIG. 3 is a cutaway view of the diaper pail of FIG. 1 as a lid being opened.
Figure 4:
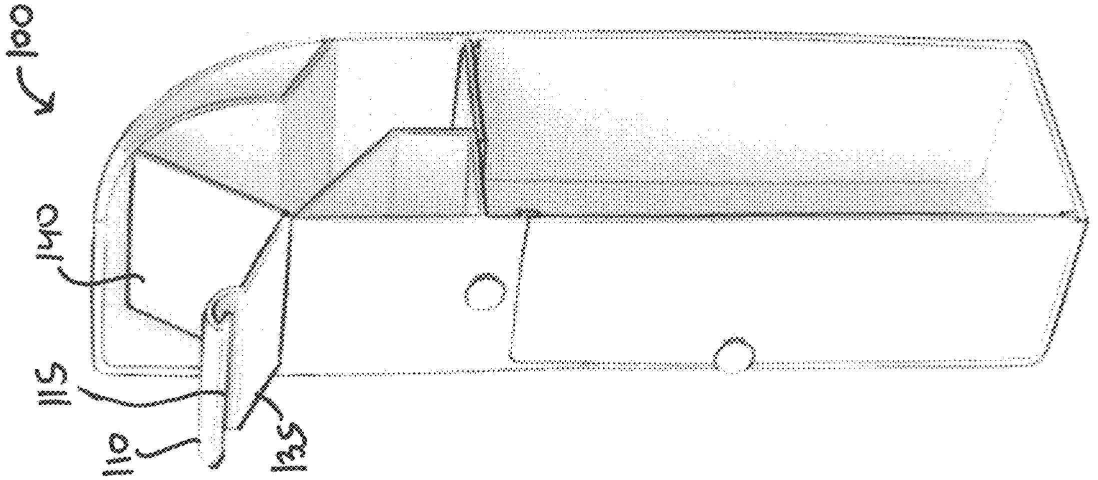
FIG. 4 is a cutaway view of the diaper pail of FIG. 1 in a first intermediate state when the lid is opened.

FIG. 2 depicts the diaper pail 100 in a closed state. The lid 110, the door 120, and the gate 165 are closed in the closed state to impede odor from escaping from the diaper pail 100. Further, FIG. 3 depicts the diaper pail 100 as the lid 110 is being opened from its closed position. FIG. 4 depicts the diaper pail 100 in a first intermediate state. The lid 110 is in its open position, the gate 165 is in its closed position, and the door 120 is in its closed position when the diaper pail 100 is in the first intermediate state.

As shown in FIGS. 2-3, the gate 165 is positioned horizontally within the body 105 of the diaper pail 100. The body 105 includes one or more inner walls 145. In the illustrated example, the inner wall(s) 145 include a vertical wall 150 and an angled wall 155. The vertical wall 150 extends upwardly from the gate 165. The angled wall 155 extends at an angle from an upper edge of the vertical wall 150 to a rotating axis of the lid 110.

The gate 165 and the inner wall(s) 145 separate the upper chamber 170 and the lower chamber 175 of the diaper pail 100. The lower chamber 175 is defined by the door 120, the gate 165, and one or more lower walls of the body 105. The upper chamber 170 is defined by the lid 110, the inner wall(s) 145, the gate 165, and one or more upper walls of the body 105.

In the illustrated example, the upper wall(s) of the body 105 includes a curved wall 160 along which the lid 110 slidably and sealingly engages as the lid 110 is rotated between a closed position (FIG. 2) and an open position (FIG. 4). The lid 110 slidably and sealingly engages the curved wall 160 to impede odor from escaping from the upper chamber 170 as the lid 110 is transitioned between its open position and its closed position.

The lid 110 of the illustrated example includes an outer panel 135 and an inner panel 140. The outer panel 135 and the inner panel 140 are positioned with respect to each other at an angle (e.g., a 60 degree angle, a 90 degree angle, a 120 degree angle, etc.). Further, the outer panel 135 and the inner panel 140 are integrally formed together and connect to each other at a proximal end, which is located at a rotational axis of the lid 110. The handle 115 is coupled to and/or integrally formed with and/or by the outer panel 135 to enable the user to easily grasp the handle 115 for operation. In the illustrated example, the outer panel 135 and the inner panel 140 have a substantially equal length such that both the outer panel 135 and the inner panel 140 are configured to slide along the curved wall 160.

As shown in FIG. 2, the outer panel 135 is configured to slidably engage the curved wall 160 when the lid 110 is in its closed position and/or as the lid 110 begins to rotate from its closed position. Further, the inner panel 140 is configured to rest against the angled wall 155 in the closed position. In FIG. 3, both the outer panel 135 and the inner panel 140 are configured to engage the curved wall 160 at an intermediate position between its closed position and its open position. As shown in FIG. 4, the inner panel 140 is configured to slidably engage the curved wall 160 when the lid 110 is in its open position. The outer panel 135 and/or the inner panel 140 slidably engages the curved wall 160 at all times to seal the upper chamber 170 from the surrounding environment at all times to prevent odor from escaping and/or reduce the amount of odor the upper chamber 170 as the lid 110 rotates between its closed position and its open position.

When the diaper pail 100 is in its first intermediate state, as shown in FIG. 4, the user is able to place a diaper in the lid 110. In particular, the user is able to place a diaper between the outer panel 135 and the inner panel 140 of the lid 110. That is, the outer panel 135 and the inner panel 140 of the lid 110 are configured to securely receive a diaper when the lid 110 is in its open position. Subsequently, the user is to rotate the lid 110 back to its closed position at which point the diaper securely falls into the upper chamber 170 of the diaper pail 100. For example, the diaper rests on an upper surface of the gate 165 when the diaper is in the upper chamber 170. At this time, the outer panel 135 of the lid 110 sealingly engages the curved wall 160 to impede odor from escaping the upper chamber 170. The user then causes the gate 165 to open which, in turn, causes the diaper to securely fall into a bag 10 (FIG. 6) positioned within the lower chamber 175 of the diaper pail 100.

Figure 5:
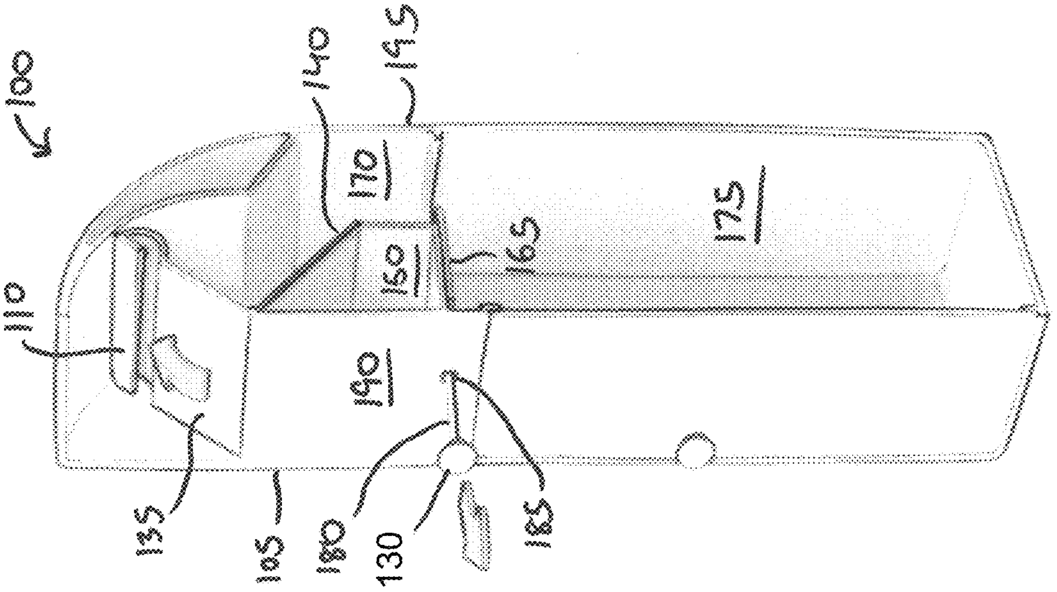
FIG. 5 is a cutaway view of the diaper pail of FIG. 1 in a second intermediate state when the lid is closed.

FIG. 5 depicts the diaper pail 100 in its second intermediate state. The gate 165 is in its open position, while the lid 110 and the door 120 remain in their respective closed positions, when the diaper pail 100 is in its second intermediate state. As shown in FIG. 5, the user is configured to pull the handle 130 to cause the gate 165 to slide from its closed position to its open position. The handle 130 is connected to the gate 165 via a shaft 180. In some examples, the gate 165 and/or the shaft 180 is spring-loaded so that the gate 165 returns to its closed position when the user releases the handle 130. Further, in the illustrated example, the diaper pail 100 includes a seal 185 that is positioned along a front wall 190 of the body 105 and circumferentially about the shaft 180. The seal 185 is configured to sealingly engage the front wall 190 and the shaft 180 to impede odor from escaping from the diaper pail 100 as the gate 165 slides between its closed position and its open position. For example, the seal 185 is configured to seal an area between the body 105 and the inner wall(s) 145 to impede odor from escaping from the diaper pail 100.

In the illustrated example, the body 105 includes the front wall 190, the inner wall(s) 145, and a rear wall 195. The vertical wall 150 of the inner wall(s) 145 is positioned equidistantly between the front wall 190 and the rear wall 195. Additionally, the length of the gate 165 is substantially equal to the distance from the vertical wall 150 to the front wall 190 and/or the rear wall 195. In turn, when the gate 165 is in its closed position, the gate 165 extends from the rear wall 195 and to or beyond the vertical wall 150 to sealingly separate the upper chamber 170 from the lower chamber 175 in a manner that contains the odor of the diapers in the lower chamber 175. When the gate 165 is in its open position, the gate 165 extends toward the front wall 190 and to or just beyond the vertical wall 150. In turn, the gate 165 does not stick out much, if at all, beyond the vertical wall 150 to ensure that the diaper falls from the upper chamber 170 and into the bag 10 housed in the lower chamber 175 when the gate 165 is opened.

Figure 6:
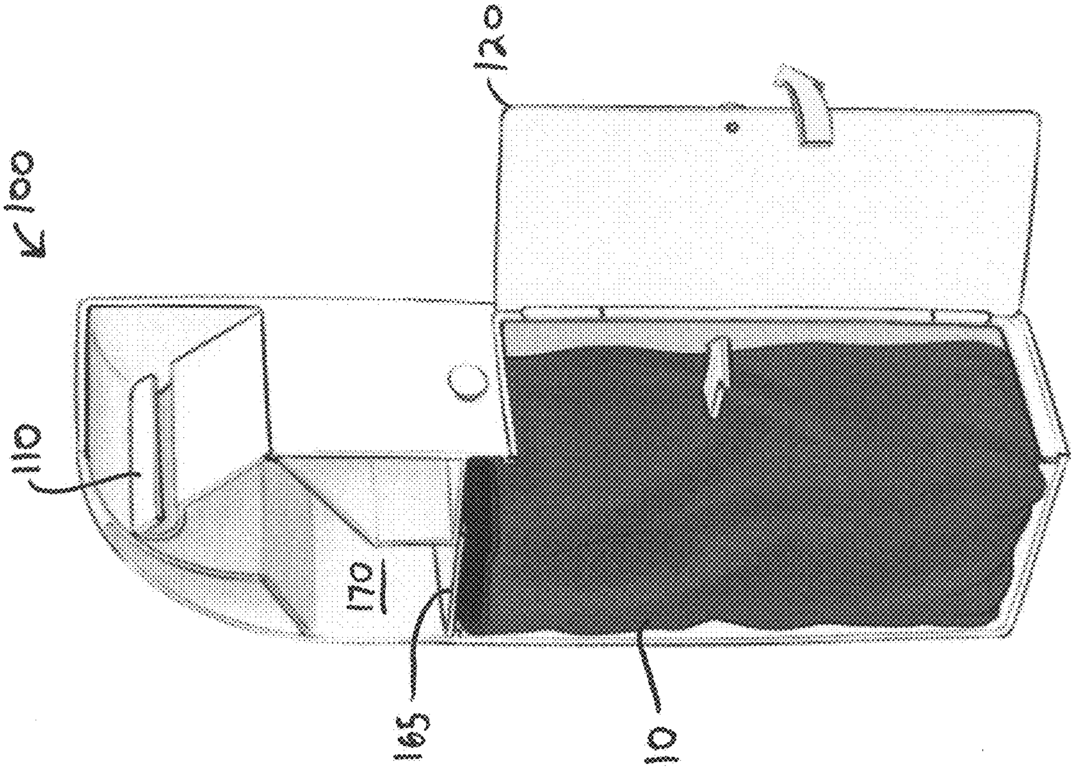
FIG. 6 is a cutaway view of the diaper pail of FIG. 1 in an open state.
Figure 7:
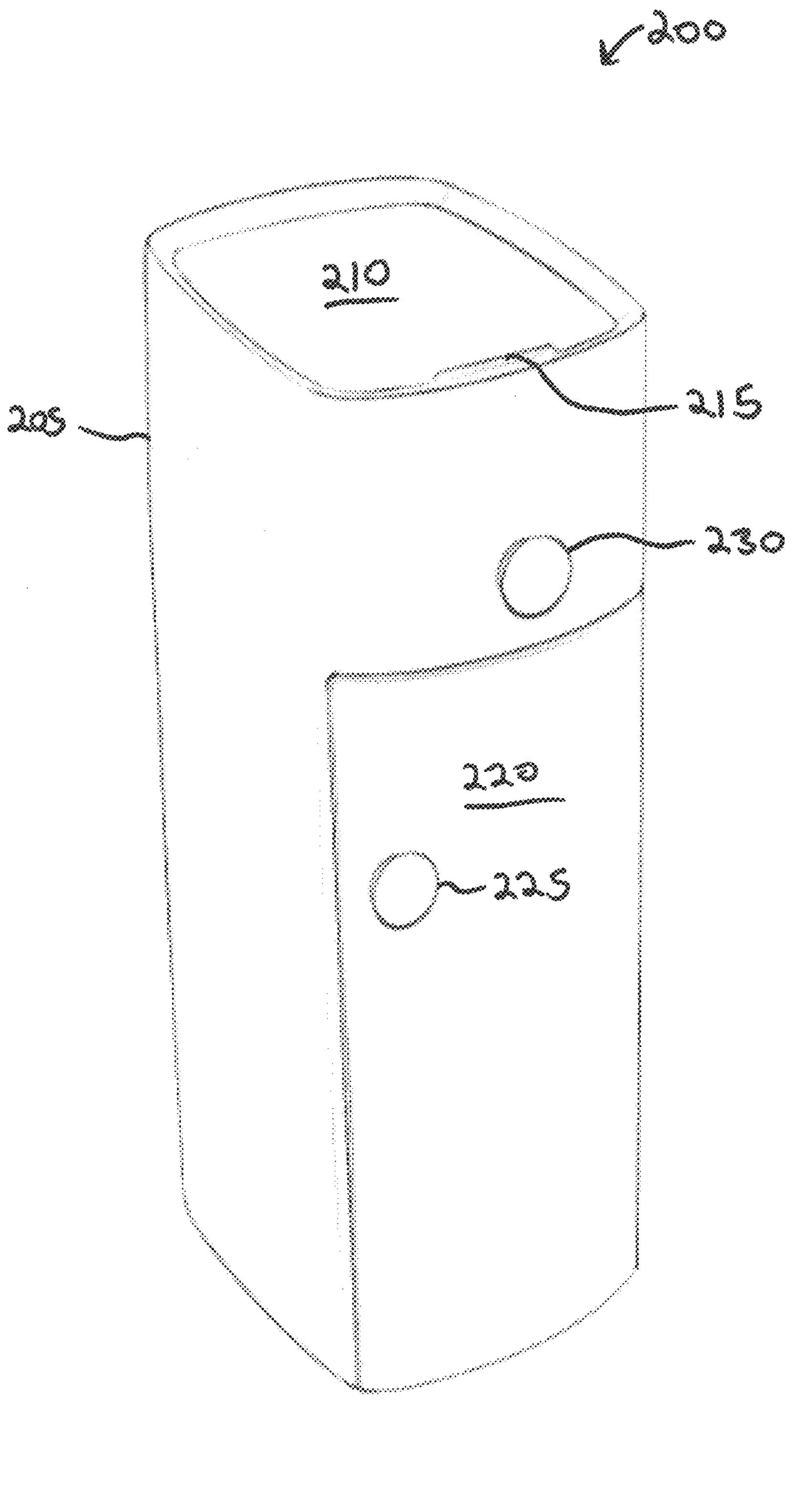
FIG. 7 is a perspective view of another example diaper pail in accordance with the teachings herein.

FIG. 6 depicts the diaper pail 100 in an open state. The door 120 is in its open position in the open state of the diaper pail 100 to enable the user to easily access, remove, and replace the bag 10 when the bag 10 is full of diapers and/or other waste. In the illustrated example, the diaper pail 100 includes one or more devices (e.g., hooks, clasps, etc.) along an upper portion of the lower chamber 175 to keep the bag 10 secure the bag 10 in place in an upright manner. The user is to use the handle 125 of the door 120 to open and closed the door 120. Additionally or alternatively, the diaper pail 100 may include other device(s) to facilitate the user in removing the bag 10 from the lower chamber 175 and/or inserting a new bag into the lower chamber 175. For example, the diaper pail 100 may include a tilting mechanism to facilitate the user in removing the bag 10 from the lower chamber 175.

FIGS. 7-12 illustrate another example diaper pail 200 in accordance with the teachings herein. The diaper pail 200 includes a body 205, a lid 210, and a door 220. As disclosed below in greater detail, the lid 210 (also referred to as an "upper lid," a chute lid," an "upper door," and a "chute door" is positioned adjacent to an upper chamber 270 (FIG. 8) of the diaper pail 200, and the door 220 (also referred to as a "lower door" and a "bag door") is positioned adjacent to a lower chamber 275 (FIG. 8) of the diaper pail 200.

In the illustrated example, the lid 210 forms an upper surface or side of the diaper pail 200. The lid 210 includes a handle 215 to enable a user to easily open and close the lid 210, and the door 220 includes another handle 225 to enable a user to easily open and close the door 220. In the illustrated example, the handle 215 is a cutout handle. In other examples, the handle 215 may be any other type of handle that enables the user to easily open and close the lid 210. In the illustrated example, the handle 225 is a knob. In other examples, the handle 225 may be any other type of handle that enables the user to easily open and close the door 220.

Figure 8:
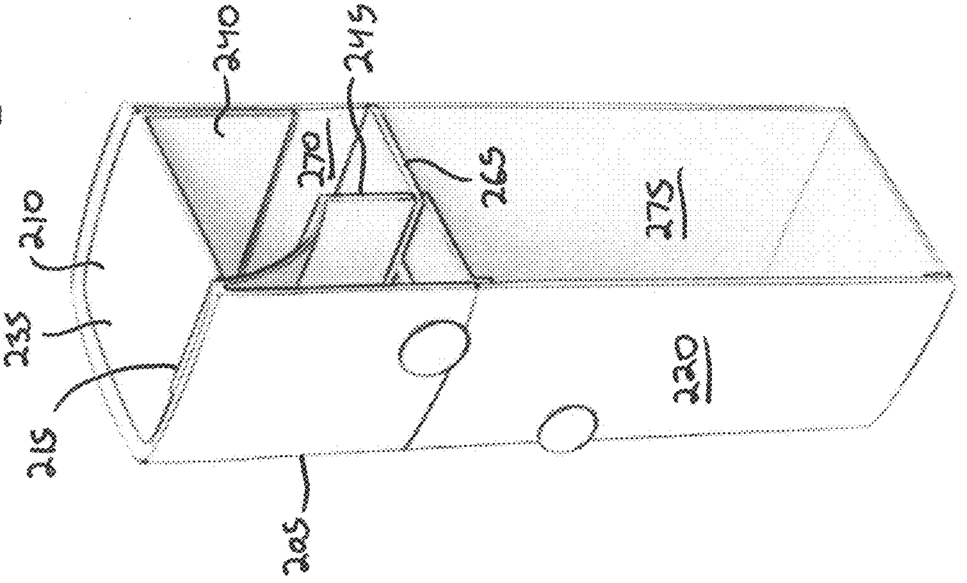
FIG. 8 is a cutaway view of the diaper pail of FIG. 7 in a closed state.

The diaper pail 200 of the illustrated example also includes another handle 230 that is configured to enable the user to easily open and close a gate 265 (FIG. 8). In the illustrated example, the handle 230 is a knob. In other examples, the handle 230 may be any other type of handle that enables the user to easily open and close the gate 265.

Figure 9:
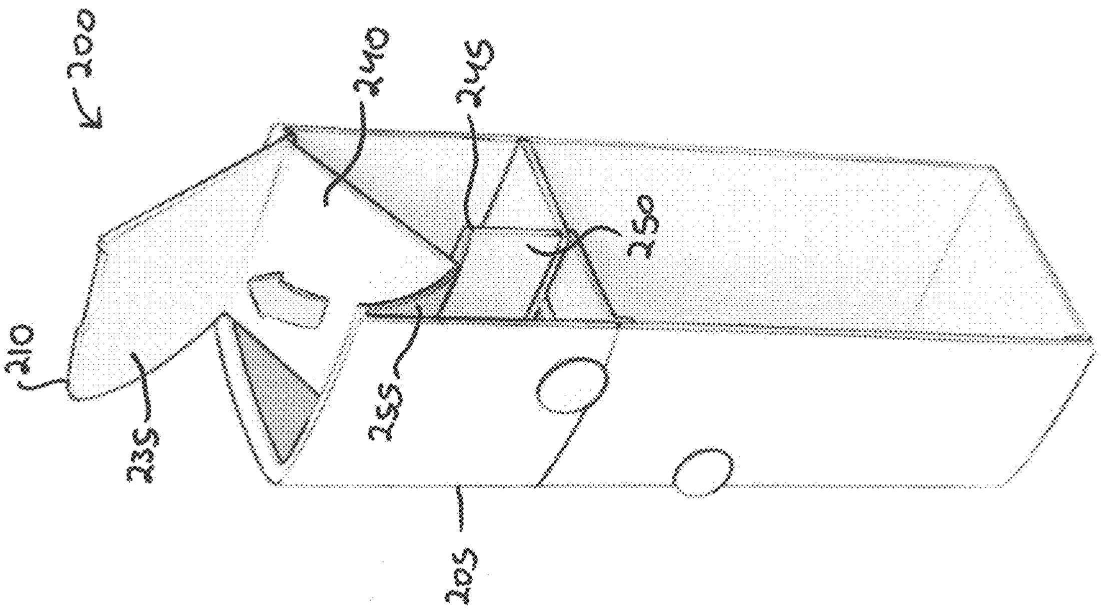
FIG. 9 is a cutaway view of the diaper pail of FIG. 7 in a first intermediate state when a lid is opened.

FIG. 8 depicts the diaper pail 200 in a closed state. The lid 210, the door 220, and the gate 265 are closed in the closed state to impede odor from escaping from the diaper pail 200. Further, FIG. 9 depicts the diaper pail 200 as the lid 210 is being opened from its closed position. FIG. 9 depicts the diaper pail 200 in a first intermediate state. The lid 210 is in its open position, the gate 265 is in its closed position, and the door 220 is in its closed position when the diaper pail 200 is in the first intermediate state.

As shown in FIGS. 8-9, the gate 265 is positioned horizontally within the body 205 of the diaper pail 200. The body 205 includes one or more inner walls 245. In the illustrated example, the inner wall(s) 245 include a vertical wall 250 and a curved wall 255. The vertical wall 250 extends upwardly from the gate 265. The curved wall 255 extends in a curved manner from an upper edge of the vertical wall 250 to a rotating axis of the lid 210.

The gate 265 and the inner wall(s) 245 separate the upper chamber 270 and the lower chamber 275 of the diaper pail 200. The lower chamber 275 is defined by the door 220, the gate 265, and one or more lower walls of the body 205. The upper chamber 270 is defined by the lid 210, the inner wall(s) 245, the gate 265, and one or more upper walls of the body 205.

The lid 210 of the illustrated example includes an outer panel 235 and an inner panel 240. The outer panel 235 and the inner panel 240 are positioned with respect to each other at an angle (e.g., a 60 degree angle, a 90 degree angle, a 120 degree angle, etc.). Further, the outer panel 235 and the inner panel 240 are integrally formed together and connect to each other at a proximal end, which is located at a rotational axis of the lid 210. The handle 215 is coupled to and/or integrally formed with and/or by the outer panel 235 to enable the user to easily grasp the handle 215 for operation. In the illustrated example, the outer panel 235 and the inner panel 240 have a substantially equal length such that both the outer panel 235 and the inner panel 240 are configured to engage the curved wall 255.

As shown in FIG. 8, the outer panel 235 is configured to engage the curved wall 255 when the lid 210 is in its closed position. Further, the inner panel 240 is configured to rest against a rear wall 295 (FIG. 11) of the body 205 in the closed position. As shown in FIG. 9, the inner panel 240 is configured to slidably engage the curved wall 255 when the lid 210 is in its open position and/or a partially open position. The outer panel 235 and the inner panel 240 are configured to engage the curved wall 255 to enclose the upper chamber 270 such that odor is prevented from escaping and/or the amount of odor escaping the upper chamber 270 is reduced as the lid 210 rotates between its closed position and its open position.

In a first intermediate state of the diaper pail 200, the lid 210 is in its open position and the gate 265 and the door 120 are in their respective closed positions. When the diaper pail 200 is in its first intermediate state, the user is able to place a diaper in the lid 210. In particular, the user is able to place a diaper between the outer panel 235 and the inner panel 240 of the lid 210. That is, the outer panel 235 and the inner panel 240 of the lid 210 are configured to securely receive a diaper when the lid 210 is in its open position. Subsequently, the user is to rotate the lid 210 back to its closed position at which point the diaper securely falls into the upper chamber 270 of the diaper pail 200. For example, the diaper rests on an upper surface of the gate 265 when the diaper is in the upper chamber 270. At this time, the outer panel 235 of the lid 210 sealingly engages the curved wall 255 to impede odor from escaping the upper chamber 270. The user then causes the gate 265 to open which, in turn, causes the diaper to securely fall into a bag 10 (FIG. 12) positioned within the lower chamber 275 of the diaper pail 200.

Figure 10:
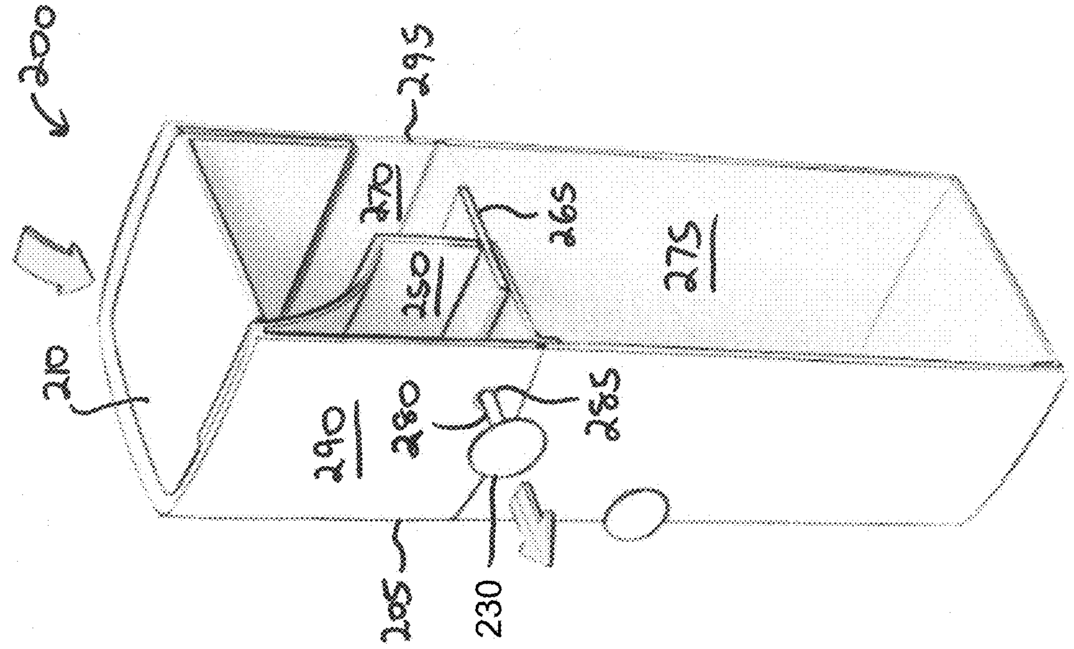
FIG. 10 is a cutaway view of the diaper pail of FIG. 7 as a gate is being opened.
Figure 11:
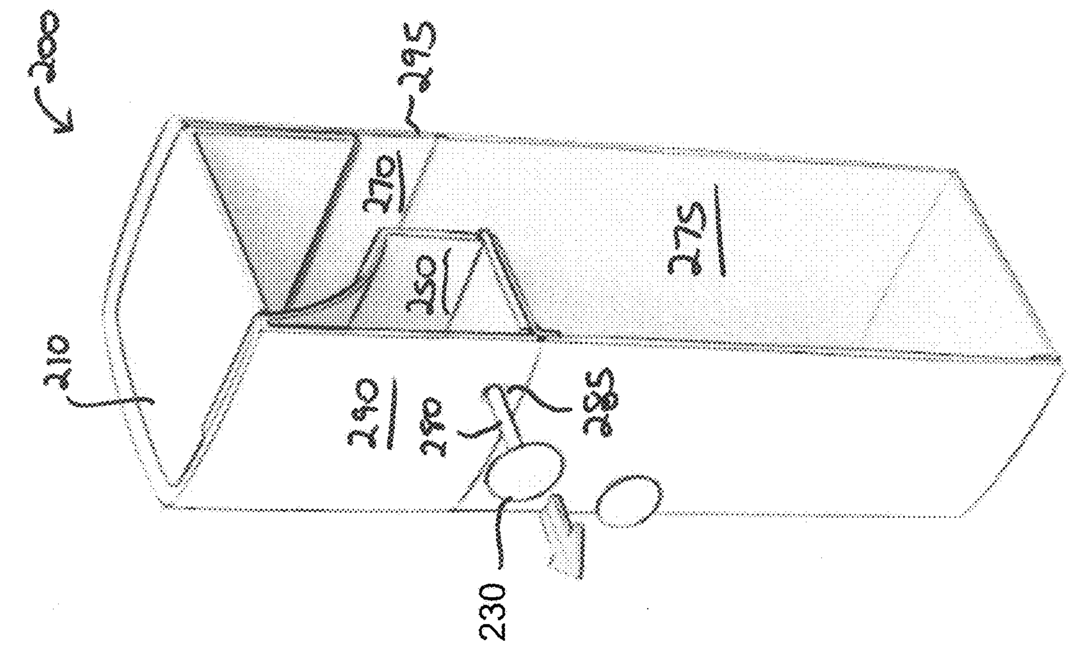
FIG. 11 is a cutaway view of the diaper pail of FIG. 7 in a second intermediate state when the gate is opened.

FIG. 10 depicts the diaper pail 200 as it transitions to its second intermediate state, and FIG. 11 depicts the diaper pail 200 in its second intermediate state. When the diaper pail 200 is in its second intermediate state, the gate 265 is in its open position and the lid 210 and the door 220 remain in their respective closed positions. As shown in FIG. 10-11, the user is configured to pull the handle 230 to cause the gate 265 to slide from its closed position to its open position. The handle 230 is connected to the gate 265 via a shaft 280. In some examples, the gate 265 and/or the shaft 280 is spring-loaded so that the gate 265 returns to its closed position when the user releases the handle 230. Further, in the illustrated example, the diaper pail 200 includes a seal 285 that is positioned along a front wall 290 of the body 205 and circumferentially about the shaft 280. The seal 285 is configured to sealingly engage the front wall 290 and the shaft 280 to impede odor from escaping from the diaper pail 200 as the gate 265 slides between its closed position and its open position. For example, the seal 285 is configured to seal an area between the body 205 and the inner wall(s) 245 to impede odor from escaping from the diaper pail 200.

In the illustrated example, the body 205 includes the front wall 290, the inner wall(s) 245, and a rear wall 295. The vertical wall 250 of the inner wall(s) 245 is positioned equidistantly between the front wall 290 and the rear wall 295. Additionally, the length of the gate 265 is substantially equal to the distance from the vertical wall 250 to the front wall 290 and/or the rear wall 295. In turn, when the gate 265 is in its closed position, the gate 265 extends from the rear wall 295 and to or beyond the vertical wall 250 to sealingly separate the upper chamber 270 from the lower chamber 275 in a manner that contains the odor of the diapers in the lower chamber 275. When the gate 265 is in its open position, the gate 265 extends toward the front wall 290 and to or just beyond the vertical wall 250. In turn, the gate 265 does not stick out much, if at all, beyond the vertical wall 250 to ensure that the diaper falls from the upper chamber 270 and into the bag 10 housed in the lower chamber 275 when the gate 265 is opened.

Figure 12:
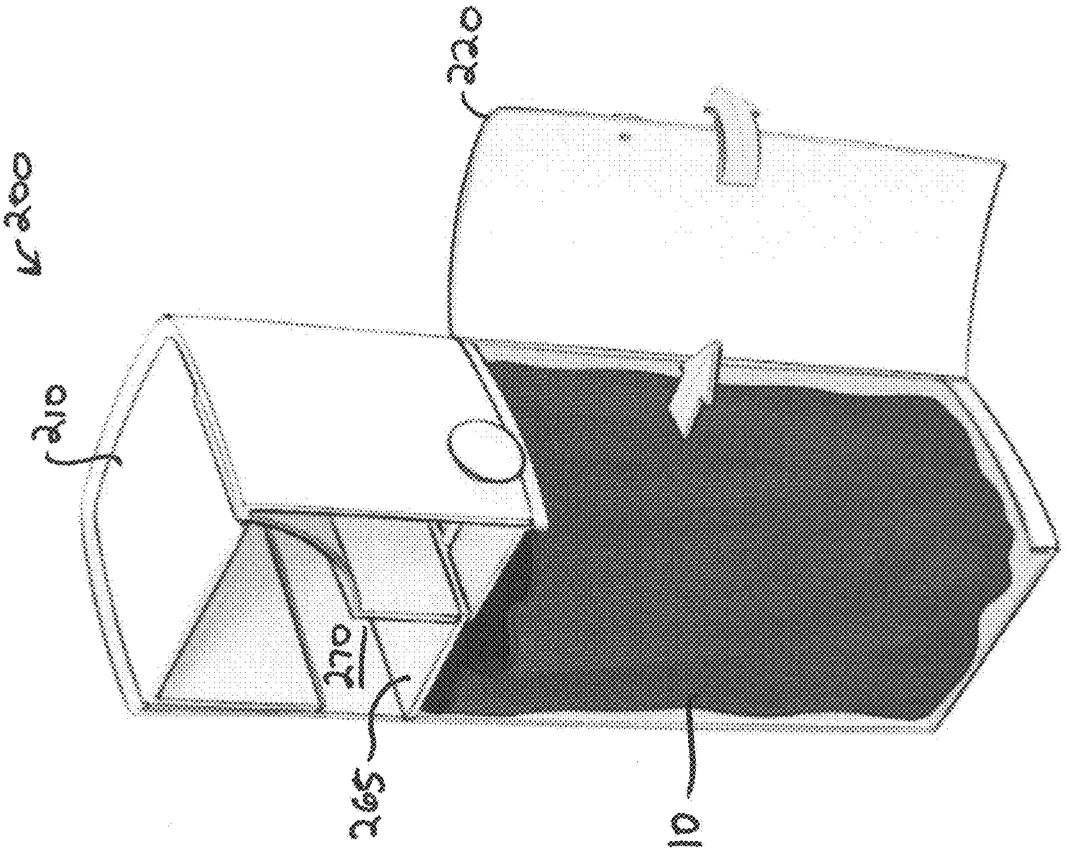
FIG. 12 is a cutaway view of the diaper pail of FIG. 7 in an open state.

FIG. 12 depicts the diaper pail 200 in an open state. The door 220 is in its open position in the open state of the diaper pail 200 to enable the user to easily access, remove, and replace the bag 10 when the bag 10 is full of diapers and/or other waste. In the illustrated example, the diaper pail 200 includes one or more devices (e.g., hooks, clasps, etc.) along an upper portion of the lower chamber 275 to keep the bag 10 secure the bag 10 in place in an upright manner. The user is to use the handle 225 of the door 220 to open and closed the door 220. Additionally or alternatively, the diaper pail 200 may include other device(s) to facilitate the user in removing the bag 10 from the lower chamber 275 and/or inserting a new bag into the lower chamber 275. For example, the diaper pail 200 may include a tilting mechanism to facilitate the user in removing the bag 10 from the lower chamber 275.

The above-described embodiments, and particularly any "preferred" embodiments, are possible examples of implementations and merely set forth for a clear understanding of the principles of the invention. Many variations and modifications may be made to the above-described embodiment (s) without substantially departing from the spirit and principles of the techniques described herein. All modifications are intended to be included herein within the scope of this disclosure and protected by the following claims.

What is claimed is:

1. A diaper pail, comprising:

a body including an upper portion and a lower portion;

a lid rotatably coupled to the upper portion of the body, wherein the lid is configured to rotate about a rotational axis to open to receive a diaper;

a gate configured to slide horizontally within the body, wherein the gate, the lid, and the upper portion of the body define an upper chamber, and wherein the upper chamber is configured to contain the diaper when the lid is subsequently rotated closed about the rotational axis; and a door rotatably coupled to the lower portion of the body, wherein the door, the gate, and the lower portion of the body define a lower chamber located below the upper chamber, wherein the lower chamber is configured to house a garbage bag such that the garbage bag is to receive the diaper from the upper chamber when the gate is slid open, and wherein the door is configured to provide access to the garbage bag for replacement when the garbage bag is full.

2. The diaper pail of claim 1, wherein, in a closed state:

the lid is in a closed lid position;

the gate is in a closed gate position; and the door is in a closed door position.

3. The diaper pail of claim 2, wherein, in an open state:

the lid is in the closed lid position;

the gate is in the closed gate position; and the door is in an open door position to enable a user to remove and replace the garbage bag.

4. The diaper pail of claim 3, wherein, in a first intermediate state:

the lid is in an open lid position to receive the diaper in the upper chamber; and the gate is in the closed gate position and the door is in the closed door position to prevent odor from escaping the lower chamber.

5. The diaper pail of claim 4, wherein, in a second intermediate state:

the lid is in the closed lid position to prevent odor from escaping the upper chamber;

the gate is in an open gate position to drop the diaper from the upper chamber an into the garbage bag in the lower chamber; and the door is in the closed door position to prevent odor from escaping the lower chamber.

6. The diaper pail of claim 1, wherein the lid includes a lid handle to enable a user to transition the lid between a closed lid position and an open lid position.

7. The diaper pail of claim 1, wherein the gate includes a gate handle to enable a user to transition the gate between a closed gate position and an open gate position.

8. The diaper pail of claim 1, wherein the door includes a door handle to enable a user to transition the door between a closed door position and an open door position.

9. The diaper pail of claim 1, wherein the body includes inner walls that include:

a vertical wall having an upper edge and extending upwardly from the gate; and an angled wall extending at an angle between the upper edge of the vertical wall and the rotational axis of the lid.

10. The diaper pail of claim 9, wherein the inner walls and the gate separate the upper chamber and the lower chamber.

11. The diaper pail of claim 1, wherein the upper portion of the body includes a curved wall, wherein the lid is configured to slidably and sealingly engage the curved wall while transitioning between a closed lid position and an open lid position.

12. The diaper pail of claim 11, wherein the lid includes a proximal end located along the rotational axis, an outer panel, and an inner panel, wherein the outer panel and the inner panel are connected to each other at the proximal end and are positioned with respect to each other at an angle.

13. The diaper pail of claim 12, wherein the lid is configured to rotate to:

the open lid position at which the outer panel is disengaged from the curved wall to receive the diaper; and the closed lid position at which the outer panel is reengaged to the curved wall and the inner panel is disengaged from the curved wall to drop the diaper onto the gate in the upper chamber.

14. The diaper pail of claim 12, wherein at least one of the inner panel or the outer panel engages the curved wall at all times while transitioning between the closed lid position and the open lid position to prevent odor from escaping the upper chamber.

15. The diaper pail of claim 1, wherein the body includes inner walls that include:

a vertical wall having an upper edge and extending upwardly from the gate; and a curved wall extending at an angle between the upper edge of the vertical wall and the rotational axis of the lid.

16. The diaper pail of claim 15, wherein the inner walls and the gate separate the upper chamber and the lower chamber.

17. The diaper pail of claim 15, wherein the lid includes a proximal end located along the rotational axis, an outer panel, and an inner panel.

18. The diaper pail of claim 17, wherein the outer panel and the inner panel are connected to each other at the proximal end and are positioned with respect to each other at an angle.

19. The diaper pail of claim 17, wherein the lid is configured to rotate to an open lid position at which the outer panel is disengaged from the curved wall to receive the diaper.

20. The diaper pail of claim 19, wherein the lid is configured to rotate to a closed lid position at which the outer panel is reengaged to the curved wall and the inner panel is disengaged from the curved wall to drop the diaper onto the gate in the upper chamber.

* * * * *